April 2, 1940.  G. F. DALY ET AL  2,195,851

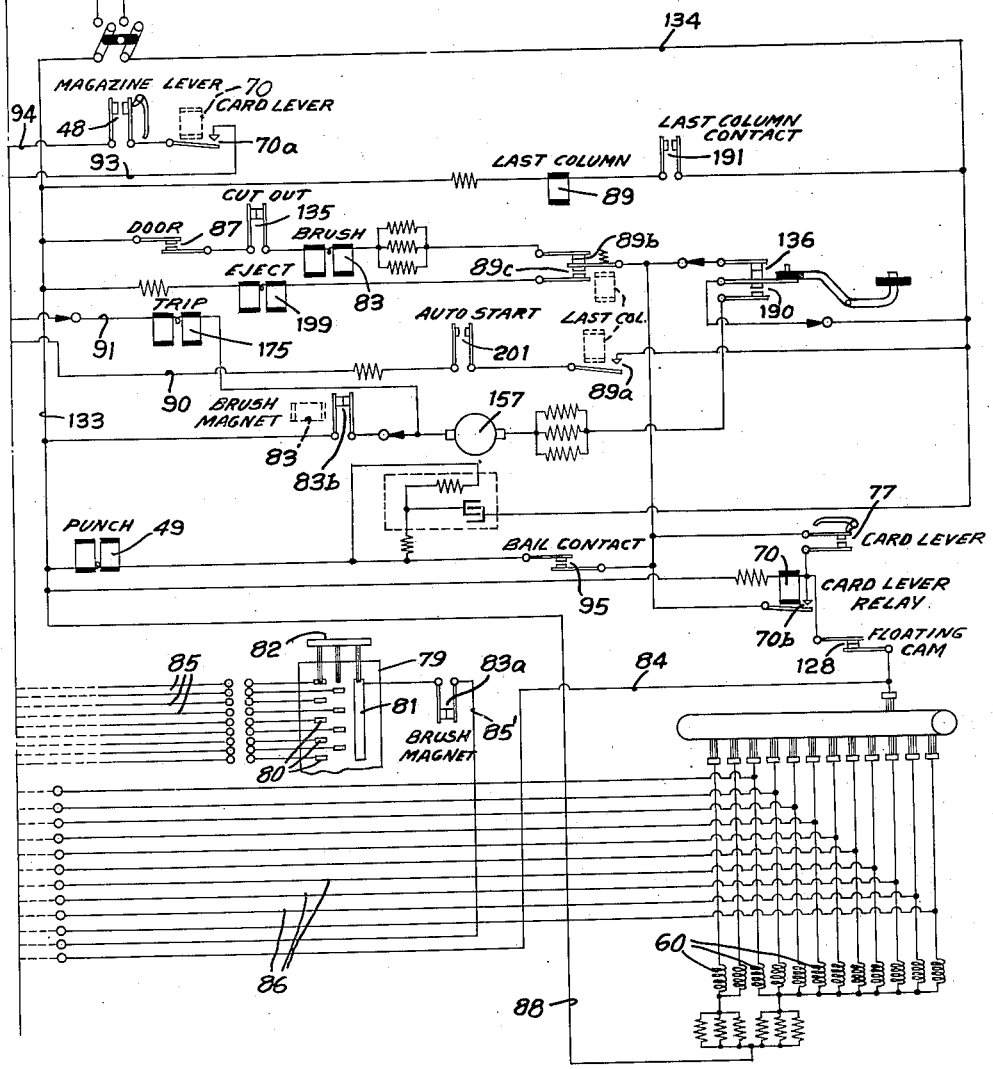

CARD FEEDING MECHANISM

Filed July 14, 1936  6 Sheets-Sheet 4

INVENTORS.
G. F. Daly and
G. J. Wills
BY
W. M. Wilson
ATTORNEY.

April 2, 1940.  G. F. DALY ET AL  2,195,851
CARD FEEDING MECHANISM
Filed July 14, 1936  6 Sheets-Sheet 5

INVENTORS.
G. F. Daly and
BY  G. S. Wells
W. M. Wilson
ATTORNEY.

April 2, 1940.　　　G. F. DALY ET AL　　　2,195,851
CARD FEEDING MECHANISM
Filed July 14, 1936　　　6 Sheets-Sheet 6

INVENTORS
G. F. Daly and
BY G. S. Wells
W. M. Wilson
ATTORNEY

Patented Apr. 2, 1940

2,195,851

UNITED STATES PATENT OFFICE 2,195,851

CARD FEEDING MECHANISM

George F. Daly, West Orange, N. J., and Gorden S. Wells, Binghamton, N. Y., assignors to International Business Machines Corporation, New York, N. Y., a corporation of New York Application July 14, 1936, Serial No. 90,478

4 Claims. (Cl. 235—61.10)

This invention relates to accounting machines and more particularly to machines of the record controlled type.

The principal object of the invention is to provide an improved accounting system in which a controlling accounting machine, such as a well known Hollerith tabulator, may be associated with a punching machine for punching data in record cards under control of the tabulating machine. As is well known, the Hollerith tabulator is provided with mechanism for feeding and sensing records arranged in groups, successively. After each group is sensed and after data therefrom have been entered into suitable accumulators, the machine enters a total taking cycle of operations, during which totals are printed from the accumulators. These machine have been used in combination with punching mechanism so that upon completion of the sensing of each group, an operation of the punching machine is instituted, during which the total in an accumulator is automatically punched in a record card. Thus, for each group of record cards fed through the tabulating machine, the punching machine prepares what is known as a summary card on which is punched the total for a group of cards. In certain classes of work, the total file of cards fed through the tabulator may contain a great many so-called single-card groups, that is, group classifications comprised of less than two cards. In such case, the summary card, prepared by the punching machine, would simply function to duplicate the amount on the card of the single-card group.

One of the main objects, therefore, of the present invention is to provide mechanism for eliminating the summary punching operations for single-card groups.

A further object of the invention is to provide mechanism for automatically identifying the single-card groups in the tabulator so that they may be readily removed from the main file and used as summary cards. This is brought about by providing so-called offsetting mechanism in the card feeding devices of the tabulator which are operated to displace the single-card groups with respect to the main file of cards. The combination of operations, that is, the suppression of summary punching for single-card groups, together with the offsetting of such cards, provides a rapid and economical method of preparing the summary card file which represents a condensation of the detailed information contained in the individual cards fed through the tabulator.

In the present invention, provision is made for permitting the punching of the summary cards for single-card groups, when such is desired, as in the case where re-arrangement of the information on the cards is required.

Further provision is made for selectively suppressing the summary punching of single-card groups for either major or minor group classifications, or both.

Various other objects and advantages of the invention will be obvious from the following particular description of one form of mechanism embodying the invention or from an inspection of the accompanying drawings; and the invention also constitutes certain new and useful features of construction and combination of parts hereinafter set forth and claimed.

In the drawings:

Figs. 1, 1a, and 1b, taken together, constitute a wiring diagram of the electric circuits of the arrangement, when these figures are arranged with Fig. 1a directly below Fig. 1 and Fig. 1b directly to the right of Fig. 1.

The two units of the apparatus comprise a tabulating machine which is of the general type shown in Patent No. 1,976,617, granted October 9, 1934, to C. D. Lake and G. F. Daly, and a punching machine of the type shown and described in the Patent No. 1,976,618, granted October 9, 1934, to F. Lee and G. F. Daly. These patents illustrate and explain in more extensive detail the manner of organization and mode of operation of the various units of the tabulating machine and of the card punching machine. In the present application, these mechanisms will be explained in only as much detail as will be necessary to set forth the manner in which the objects of the invention may be realized.

Tabulating machine operation

Figure 1:
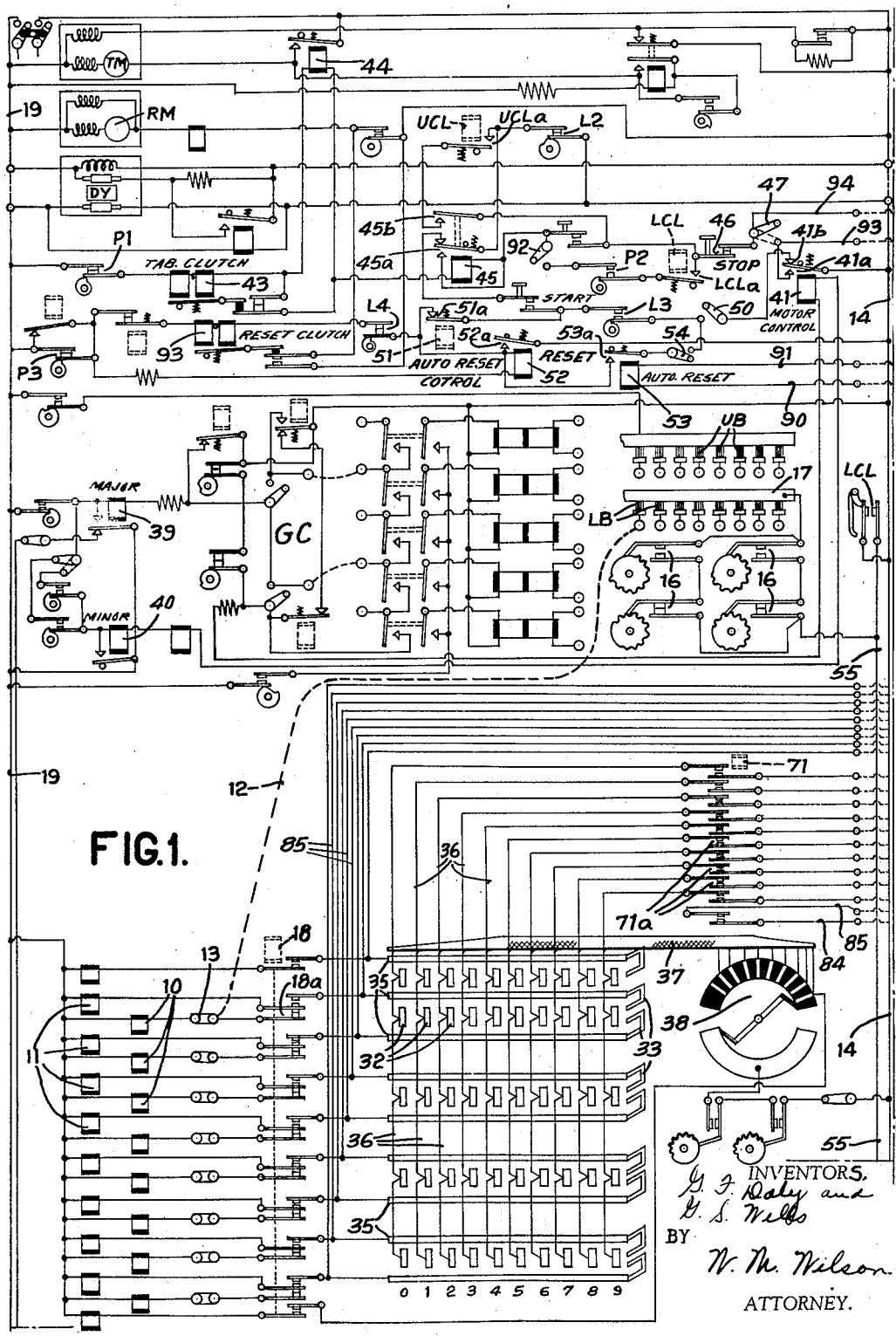
Figure 1A:
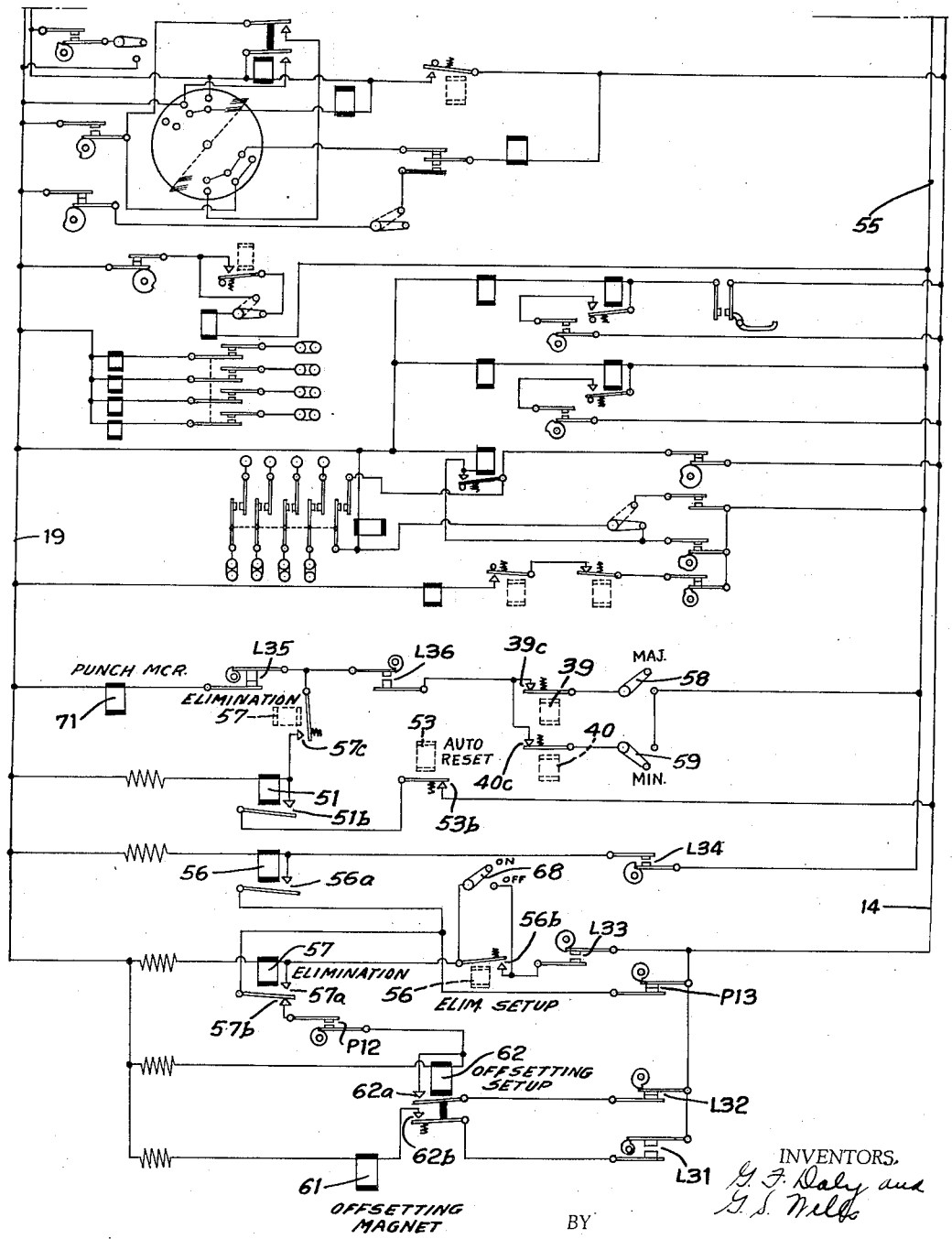

In Figs. 1 and 1a is shown the wiring diagram of the tabulating machine, which is substantially that shown in Patent No. 1,976,617. During card feeding and sensing operations, the machine is driven by the tabulating motor TM which is controlled by a group of circuits including relays and cam operated contacts and during total taking operations, the machine is driven by a motor RM which is also controlled by relays and cam controlled contact devices, which are illustrated in the upper portion of Fig. 1. During the operation of the motor TM, the usual perforated cards will feed successively to pass a pair of upper analyzing brushes UB (see Fig. 5) and then to pass lower analyzing brushes LB. As they pass the latter, the items represented by the perforations may be entered into accumulators represented by accumulator magnets 10 (Fig. 1) and printed under control of printing magnets 11. The cards continue to feed and the successive items continue to be entered as long as certain classification holes do not change, this being taken care of by the usual group control mechanism, generally designated GC. On a change in the group classification perforations, the group control system interrupts accumulating and item printing. During the ensuing total taking operations, printing is controlled by the readout devices of the accumulator and this same readout mechanism will control the operation of the punching machine to perforate a record card in accordance with the total standing on the accumulator in a manner to be more fully explained.

Each card column contains ten index point positions differentially located to represent the ten digits and a different digit is represented by a perforation in each position. As the card passes the lower brushes LB, the position of its index points determines the time of closure of circuits. As each record card column passes its lower brush LB, a printing circuit will be completed upon the analysis of a hole, which is traceable as follows: from the right side of line 14, through lower card lever contacts LCL (Fig. 1), contact devices 16, lower brush contact roller 17, perforation in the record card, a plug connection, such as, for example, 12 which extends to a socket 13, normally closed contacts 18a, printing magnet 11 to left side of line 19. This is the normally effective printing circuit. A parallel circuit will also extend from socket 13, through accumulator magnet 10, whereby the same amount will be added, as well as printed. The mechanism controlled by the printing magnet 11 is fully disclosed in Patent No. 1,976,617.

Figure 8:
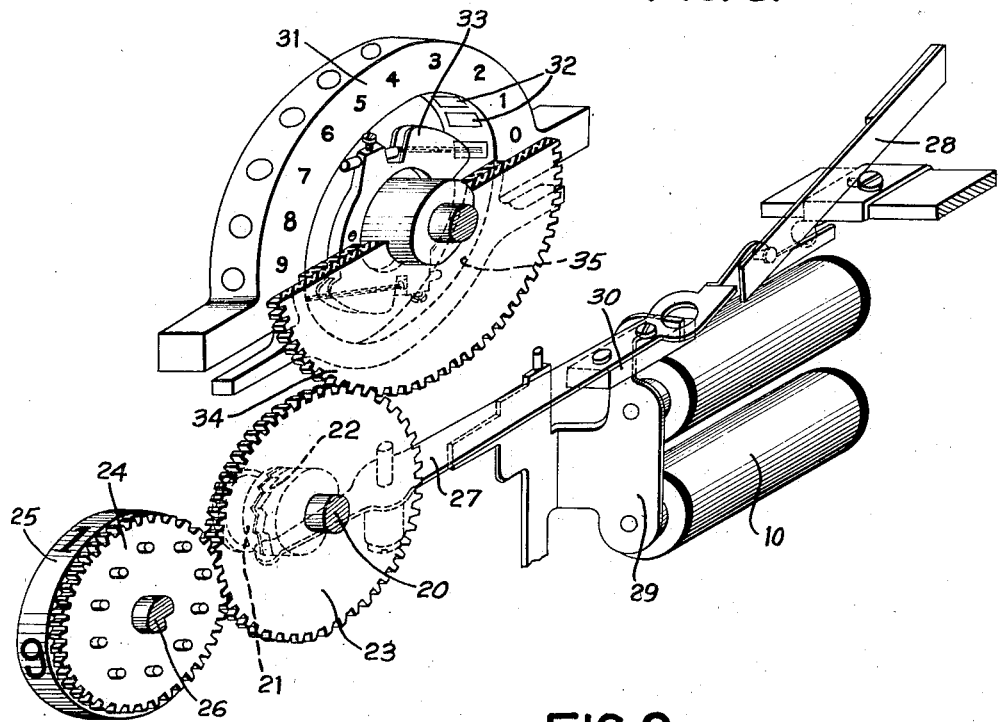
Fig. 8 is an isometric of a denominational order of an accumulator.

The mechanism controlled by adding magnet 10 is shown in Fig. 8. This adding mechanism is of the well known Hollerith type and its operation briefly is as follows: A shaft 20 is driven in the usual manner with the card feeding mechanism so as to make one revolution for each card passing through the machine. Attached to shaft 20 and rotating therewith are clutch elements 21 which are shiftable along the shaft to engage the other faces 22 of the clutches. These latter elements are integral with gears 23 which mesh with gears 24 associated with the usual numeral or index wheels 25 freely carried on shaft 26. Each clutch element 21 is normally urged towards its related element 22 by a pivoted lever 27 which is urged in a counterclockwise direction by a leaf spring 28. Movement in this direction is normally prevented by an armature latch 29 which engages a block 30 to hold the arm 27 in the position shown in Fig. 8. When magnet 10 is energized, the latch 29 is released and the driving element 21 engages 22 to cause rotation of the index wheel 25. At the end of each revolution of shaft 20, the clutch 21 is mechanically disengaged in the usual manner so that the amount of rotation imparted to the index wheel 25 is dependent upon the time in the cycle at which magnet 10 is energized. Thus, if magnet 10 is energized at the "5" time, wheel 25 will be advanced five steps before the clutch 21 is disengaged.

Associated with each adding wheel is a total readout device which consists of a commutator 31 provided with segments 32 corresponding in number and position to the several digit indicating positions of the index wheel 25. A brush structure 33 is carried by and insulated from a gear 34 meshing with gear 23 so that the brush structure 33 is angularly displaced an amount corresponding to the reading on the numeral wheel. The structure carries two brushes, one of which engages the segments 32 and the other engages a common segmental conductor 35 whose contacting surface is concentric with the supporting shaft of gear 34. The segments 32 and conductors 35 are diagrammatically represented in developed form in the circuit diagram at the bottom of Fig. 1. Each group of segments 32 corresponding to the same digit is connected to a common conducting wire 36 whereby all the "9" segments are in multiple, all the "8" segments are in multiple, and so on. The wires 36 have a branch extending through a cable 37 to an emitter 38, shown diagrammatically, which is driven in synchronism with the movement of the printing mechanism during total printing operations and under control of this emitter total printing is effected in exactly the same manner as set forth in Patent No. 1,976,617, and as the total printing circuits per se are not part of the present invention, their detailed tracing need not be explained herein.

A brief explanation will now be given of the sequence of operation of the tabulating machine to point out those operations whose understanding is essential to the operation of the present arrangement. As is usual in tabulating machines, an initial resetting cycle of operations is effected, as explained in the patent referred to, to insure that the accumulating devices are clear and also to set up the group control mechanism. During this cycle, the so-called major control relay 39 and the minor control relay 40 (Fig. 1) are energized and the motor control relay 41 is also energized and a holding circuit provided for maintaining it in such condition until the classification data of the record cards being analyzed change. Contacts 41a will accordingly be closed and contacts 41b will be open. The machine is now ready to start card feeding operations after cards have been placed in the feeding magazine 42 of Fig. 5. After the initial starting circuits have been completed, motor TM receives current and the holding circuit therefor is established, which is traceable as follows: from left side of line 19, motor TM, contacts of relay magnet 44 to line 14. A circuit is established through the tabulating clutch magnet 43 which couples the card feeding, listing, and adding mechanism to the motor TM. This circuit is traceable as follows: from left side of line 19, cam contacts P1, tabulating clutch magnet 43, motor relay magnet 44, start relay magnet 45, its contacts 45a which are now closed, upper card lever relay contacts UCLa, closed after a card has been advanced to the upper brushes, contacts 45b, stop key contacts 46 and (if switch 47 is in its dotted line position) through relay contacts 41a to right side of line 14. As long as this circuit is maintained cards will continue to feed and the data thereon will be analyzed and the printing and adding mechanisms will be controlled accordingly.

Upon a change in group classification in the cards sensed, the group control mechanism GC will cause deenergization of the motor control relay 41 to break the circuit and the tabulating clutch magnet 43 and the motor TM will be deenergized to interrupt further card feeding and adding operations.

The switch 47 is provided for the purposes of the present invention and when in full line or open position, includes in the holding circuit connections which extend to the punching machine and connect a card lever 48 and a card lever relay contact 70a in series with the holding circuit (see Fig. 1b). These contacts 48 and 70a are located in the punching machine, as will be explained, and serve to prevent operation of the tabulating machine when switch 47 is open and the summary card to be punched is not properly positioned in readiness to receive punching. Upon deenergization of relay 41, the tabulator normally enters upon total taking and resetting operations if switch 50 (Fig. 1) is closed. The initiating circuit is traceable from line 14, contacts 41b, switch 50, cam contacts L3, relay contacts 51a, reset relay 52, cam contacts P3, to line 19.

Following the completion of this circuit, cam contacts L4 close and the reset clutch magnet circuit is completed from line 14, through contacts 52a, contacts L4, reset clutch magnet 93, and thence to line 19. Energization of reset clutch magnet 93 will bring about energization of the motor RM and the total taking and resetting mechanism of the machine will function in the normal manner. The relay contacts 51a have been inserted in the reset clutch magnet circuit and are opened under control of the relay 51, during summary punching operations, so that the reset mechanism is not brought into play immediately upon the group change, but will await the completion of summary punching; that is, if summary punching is to be effected due to the prior accumulation of data from multiple card groups, the contacts 51 are opened in the manner to be explained, while if a single card group has been sensed, the contacts remain closed so that the total taking and reset cycle of operations follows immediately upon the group change with no intervening punching operations. When summary punching takes place, the total taking and reset operations are held in abeyance until relay magnet 53 is energized to close its contacts 53a and if switch 54 is closed, a circuit is traceable from line 14, contacts 41b, switches 50 and 54, contacts 53a, relay magnet 52, contacts P3, to line 19. This will bring about energization of the reset clutch magnet 93 and motor RM as before. The auto reset magnet 53 is energized under control of the mechanism of the punching machine after summary punching of the card when the total standing on the accumulator has been completed. The manner in which this is effected will be pointed out hereinafter.

The circuits for controlling the operation of the automatic reset control relay 51 are shown at the bottom of Fig. 1a. Before explaining the circuits in detail, it may be pointed out that if, following a total taking and reset cycle, only a single adding cycle takes place before total taking is again initiated, this is an indication that the card just sensed is a single card group and if more than one cycle follows a reset cycle, it is an indication that the cards sensed during such cycles constitute a multiple card group. Thus, if it is determined whether one or more than one adding cycle follows a reset cycle, it can be determined whether the total taking operations have been initiated by a single or multiple card group.

Figure 9:
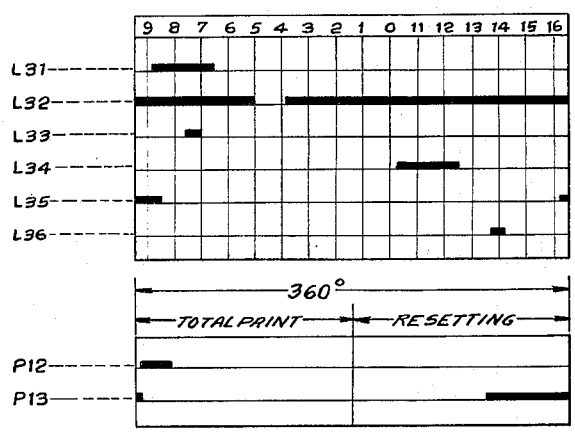
Fig. 9 is a timing chart of the electrical devices which have been added to prior structure to show their timing.

For the purposes of the present invention, cam contacts L33 and L34 are provided whose timing is as indicated in Fig. 9. In the latter half of each listing cycle, contacts L34 close completing the circuit from line 14 (Fig. 1) through the lower card lever contacts LCL, wire 55 (Fig. 1a), contacts L34, elimination setup relay 56, to line 19. This will cause closure of contacts 56a to set up a holding circuit from line 19, relay 56, contacts 56a, cam contacts P13, to line 14. If now another listing cycle follows, the cam contacts L33, which as seen in Fig. 9 close and open again early in the cycle before contacts L34 close, will complete a circuit from line 14, through contacts L33, relay contacts 56b, now closed, elimination relay 57, to line 19. Contacts 57a will be closed by the relay to provide a holding circuit from line 19, relay 57, contacts 57a and cam contacts P13, to line 14. The relay 57 will also close a pair of contacts 57c to provide a circuit for the energization of the relay magnet 51, which, as explained above, prevents the automatic initiation of reset until summary punching has been effected. The major and minor control relays 39 and 40 are provided with relay contacts 39c and 40c respectively, which are open due to the energization of these relays during adding operations. Near the end of the cycle in which the last card of a group is analyzed, the relay magnets 39 and 40 may be deenergized, permitting closure of their respective contacts 39c and 40c. Closure of cam contacts L36, whose timing is as in Fig. 9, causes a circuit to be completed from wire 55, through either of the switches 58 and 59, contacts 39c or 40c, cam contacts L36, relay contacts 57c, relay 51, to line 19. Contacts 51b provide a holding circuit through normally closed contacts 53b which remain closed until relay 53 is energized after the completion of punching operations. It will be observed that cam contacts L36 cannot be effective until the second listing cycle (when there is a multiple card group) since the relay 57 is not energized until earlier in the same cycle. Near the end of the last multiple card group listing cycle, closure of cam contacts L35 will complete a circuit from line 19, through the punch multi-contact relay 71, contacts L35, 57c, 51b and 53b, to line 14. This multi-contact relay has its related contacts 71a wired to the readout devices of the accumulator, as shown in Fig. 1, and serves to connect these devices to the punch selecting magnets of the punching machine, as will be explained.

Figure 7:
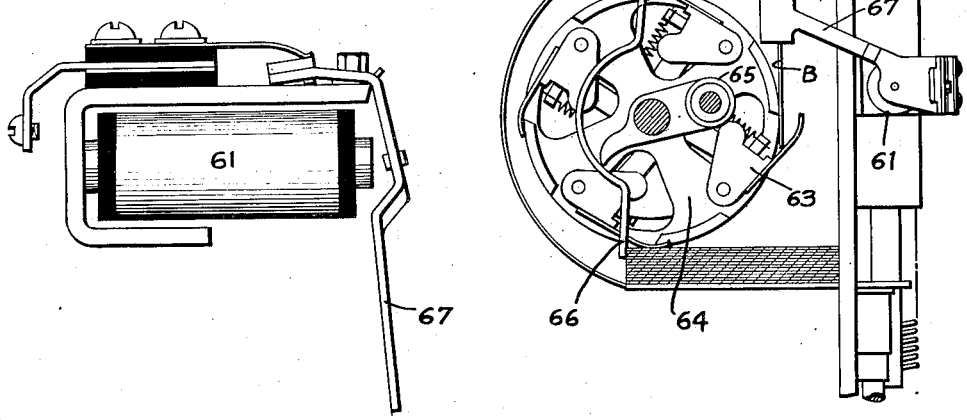
Fig. 7 is a detail of the offsetting device.

If switch 58 is open, the punch multi-contact relay 71 will only be energized upon minor group changes and if switch 59 is open and switch 58 closed, only major group changes will bring about energization of the relay 71, while if both are closed, either type of change will effect energization of the relay. The single-card group offsetting mechanism is controlled by a magnet 61 (Figs. 1a and 7) which is energized whenever a single-card group is analyzed. This magnet is controlled by the circuits shown at the bottom of Fig. 1a and includes an offsetting setup relay 62 which is energized during a reset cycle through a circuit traceable from line 14, cam contacts P13, relay contacts 57b, cam contacts P12, relay 62, to line 19. A holding circuit is established by contact 62a traceable from line 14, cam contacts L32, contact 62a, relay 62, to line 19. As explained above, the elimination magnet 57 is energized if a multiple card group is sensed and remains deenergized if a single-card group is sensed, so that the circuits just traced are established during the total taking cycle following the sensing of a single-card group.

Figure 6:
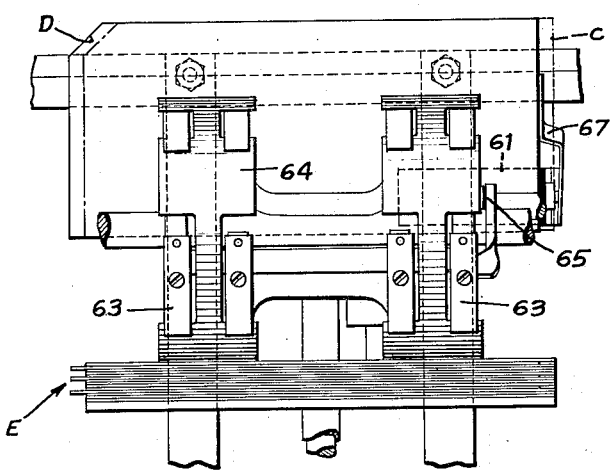
Fig. 6 is an end view of the stacking drum to show the manner of offsetting the single card groups.
Figure 5:
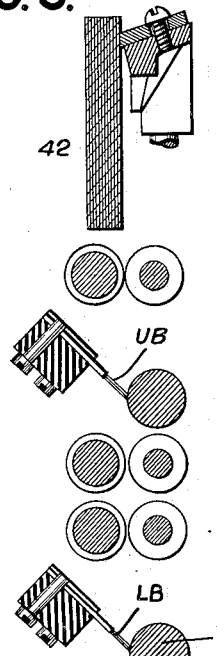
Fig. 5 is a diagrammatic showing of the card feeding, sensing, and stacking mechanism of the tabulator.

Referring to Fig. 5, while this total taking operation is in progress, the single card is substantially in the position in the card feed rollers as indicated at A. Upon resumption of card feeding, this card will be advanced downwardly and when in the position indicated at B where it is resting upon the open jaws 63 of the stacker drum 64, it will be given a slight movement in the direction of its length. The clips 63, as they rotate with the drum, are engaged by a fixed cam 65 which serves to open them at the proper time to permit entry of the card into the clips, after which they close upon the card and draw it about the drum until it is stripped from the clips by the usual stripper arm 66. It is thus seen that it is necessary to provide a delay in the operation of the offsetting magnet until the single card has reached the offsetting position and to provide sufficient time during which the card is free to be shifted laterally. The magnet 61, when energized, rocks its armature, which is integral with deflecting arm 67 (see Figs. 6 and 7) to shift the record card from the position indicated at C in Fig. 6 to the position D. Thus, after a number of groups of cards have been fed through the machine, the single cards will project in the direction of their length from the main group of cards, as shown at E' in Fig. 6. The single card groups may thus be readily identified and easily withdrawn from the main file to be used as summary cards, together with the newly punched summary cards of the multiple card groups.

Referring again to Fig. 1a, the relay magnet 62, as we have seen, is energized during the total taking cycle initiated by the single card group. The relay also closes a pair of contacts 62b which permit the completion of a circuit upon closure of cam contacts L31 when card feeding is again resumed. This circuit is traceable from line 14, cam contacts L31, contacts 62b, offsetting magnet 61, to line 19.

A switch 68 is provided which when moved to the "off" position will short circuit the relay contacts 56b so that the elimination relay 57 is energized each listing cycle and consequently offsetting magnet 61 will not be energized and no offsetting operations will take place. Moreover, this action will also cause energization of the punch multiple contact relay for each group of cards regardless of whether it is a single-card or a multiple card group and a summary card will be prepared for each of the card groups.

*The punching machine*

Figure 2:
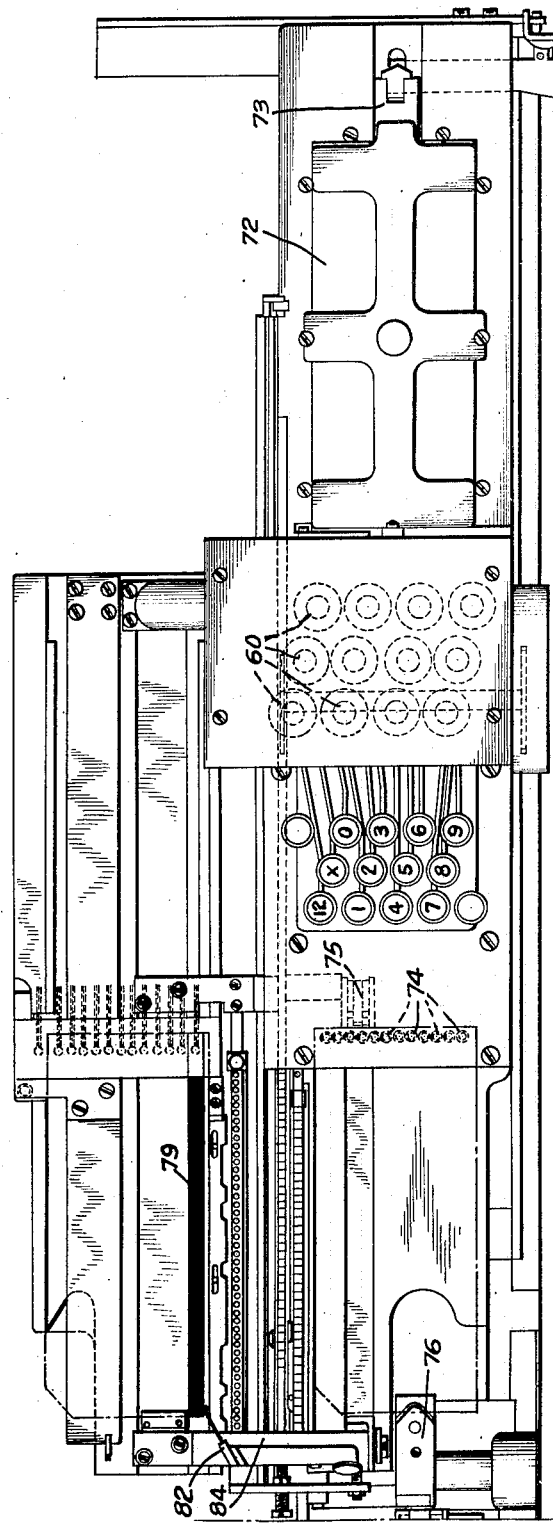
Fig. 2 is a plan view of the punching machine.
Figure 3:
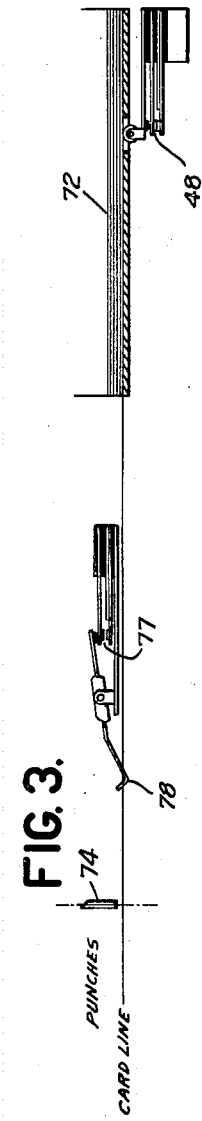
Fig. 3 is a detail showing the arrangement of certain card lever contacts in the punch.

The punching machine is the same as that disclosed in Patent No. 1,976,618 and is shown in plan elevation in Fig. 2. Certain modifications have been made therein to enable it to be controlled by the tabulating machine. These changes will be pointed out after the general operation has been briefly explained. Referring to Fig. 2, blank cards are placed in the supply magazine 72 from which pusher 73 advances the lowermost card to a position wherein the first or left hand column of the card is in line with the row of punches 74. From this position the pusher 75, which is under control of escapement mechanism, will advance the card step by step by the row of punches to the position indicated in Fig. 2. From this position the gripper 76 of the ejecting mechanism will flip the card into a discharge hopper. For the purposes of the present invention, a pair of contacts 48 (Fig. 3) is disposed beneath the magazine 72 and as long as cards are in the hopper, the contacts will be closed and will open when the supply is exhausted. A second pair of contacts 77 is arranged to be operated by a card lever 78 which lies in the path of the record card between the line of punches and the supply magazine. These contacts will close if a card is advanced and will fail to close if for some reason the card does not properly feed from the supply magazine.

Figure 4:
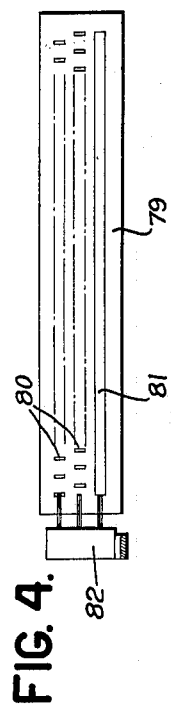
Fig. 4 is a detail of the column selector of the punch.

A column selecting device is also provided (see Fig. 4) which comprises an insulating block 79 with a plurality of separate conducting segments 80 and a common conductor 81 which are traversed by electrically connected brushes 82. The brushes 82 are carried by the carriage 84 to which the pusher 75 is secured, and, as the carriage advances to present the card columns to the line of punches in succession, the brushes 82 will successively connect the segments 80 to the common conductor 81.

The further operation of the punching machine may best be explained in connection with the circuit diagram (Fig. 1b) which includes the elements shown in the circuit diagram of the Patent No. 1,976,618. For convenient cross-reference the elements in Fig. 1b corresponding to those in the patent are designated with the same reference characters so that the patent may be readily referred to for further detailed explanation of the same. The sequence of operations will now be traced to explain the manner in which summary punching is effected.

It will first be assumed that data from each of the cards of a multiple card group have been accumulated in the adding mechanism and that a group change has brought about the deenergization of the minor control magnet 40 and major control relay magnet 39. As explained above, this will have resulted in the energization of the auto reset relay 51, opening its contacts 51a, whereby the automatic reset operation is interrupted and has also caused energization of the punch multi-contact relay magnet 71, causing closure of its contacts 71a. With the first column of the card which is to receive punching standing at the line of punches and the column selector brush 82 standing on the corresponding segment 80, a punch selecting circuit will immediately be completed from right side of line 134 (Fig. 1b) through contacts 136, card lever relay contacts 70b, which are now closed, floating cam contacts 128, wire 84, lowermost pair of contacts 71a (Fig. 1), wire 85', brush magnet contacts 83a, common conductor 81, brush 82, segment 80, one of the wires 85 (Fig. 1) of the appropriate column, conductor 35, thence through the brush structure 33 to the appropriate segment 32, wire 36, appropriate contacts 71a, wire 86, to the punch selecting magnet 60 corresponding to the value of the digit represented by the setting of the accumulator brush 33, and thence through wire 88 to left side of line 133.

Energization of magnet 60 will advance the usual punch interposer and will cause closure of the bail contacts 95 and this will complete the circuit to the punch magnet 49. This circuit is traceable from line 133, punch magnet 49, contacts 95 and 136, to line 134, resulting in the perforation of the appropriate index point position in the selected column and the automatic escapement of the card carriage to the next column to be perforated and the selecting circuit will again be repeated to perforate the next digit.

The manner in which the relay contacts 70b are closed is as follows: As the card is advanced from the supply magazine to the punches, contacts 77 close completing the circuit from line 133 to the card lever relay magnet 70, contacts 77 and 136, to line 134. The energization of magnet 70 closed its contacts 70b and the circuit now follows from line 134, contacts 136, contacts 70b, magnet 70 to line 133, this circuit remaining energized until opening of contacts 136 which takes place upon the advance of the next card from the supply magazine.

After all the selected columns have been punched, the card advances automatically to the so-called last column position from which it is to be ejected. In this last column position, the carriage causes closure of the last column contacts 191, which, for the purposes of the present invention, are wired in series with a relay 89 which controls contacts 89a, 89b, 89c, as indicated in Fig. 1b. The consequent closure of contacts 89c will complete a circuit from line 133 to the eject magnet 199, contacts 89c, contacts 136, to line 134. Energization of magnet 199 will cause the card to be ejected from the last column position to the discharge hopper and the mechanism for effecting this ejection will also cause closure of a pair of so-called auto start contacts 201 which complete a circuit from line 134, contacts 89a, now closed, contacts 201, wire 90 (Fig. 1), auto reset magnet 53, wire 91, trip magnet 175 (Fig. 1b), brush magnet contacts 83b, to line 133.

Energization of trip magnet 175 will cause closure of contacts 190 and opening of contacts 136, the latter breaking the circuit to the card lever relay 70 and the former completing the circuit from line 134, contacts 190, motor 157, contacts 83b, to line 133. With the motor 157 in operation, the new card is advanced from the supply magazine 72 to the first column position, and upon arrival of the card in this position, the contacts 136 will again close and contacts 190 will open so that if the card has been fed to the punching position, the incidental closure of card lever contacts 77 will again energize card lever relay 70 and set up the holding circuit therefor.

Switches 54 and 50 (Fig. 1) are closed for this operation so that upon the energization of the auto reset relay magnet 53 and closure of its contacts 53a, a circuit will be completed from line 14 (Fig. 1), contacts 41b, which are now closed, switches 50, 54, contacts 53a, cam contacts L4, reset clutch magnet 93, contacts P3, to line 19. Magnet 52 closes its contacts 52a to provide a circuit from line 14, contacts 52a, magnet 52, contacts P3 to line 19, and a parallel holding circuit from line 14, contacts 52a, contacts L4, magnet 93 to line 19. The normal total taking and resetting operation of the tabulating machine will now follow in the regular manner. Near the end of the total taking and resetting operation, if switch 92 (Fig. 1) is closed, cam contacts P2 will initiate the usual automatic starting circuit to cause resumption of tabulating operations. This circuit is traceable from line 14 (Fig. 1), contacts 41a, now closed, wire 93 (Fig. 1b), contacts 70a, 48, wire 94 (Fig. 1), stop key contacts 46, lower card lever relay contacts LCLa, contacts P2, switch 92, start relay 45, motor relay 44, tabulator clutch magnet 43, contacts P1, to line 19. The inclusion in this start circuit of the card lever contacts 48 and 70a is to prevent the resumption of tabulating operations if the supply of cards in the punch magazine has become exhausted, or if the next card to be punched has not been properly advanced to punching position.

From the above explanation it will be apparent that if a group change occurs upon sensing of a single-card group, magnets 51 and 71 will not be energized so that no punching operation will take place and the circuit to the reset clutch magnet 93 will follow immediately upon the group change and card feeding will again resume after the total taking operation is completed. In addition, as pointed out, the single card will be shifted lengthwise before it is deposited in the discharge stack.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a machine controlled by record cards advanced therethrough in succession, wherein the record cards each contain classification designations and are arranged in groups according to said designations so that single card groups may be interspersed with multiple card groups, said machine having card feeding means for normally advancing the cards in a predetermined line of travel, means for sensing the classification designations on the cards, group control mechanism responsive to said sensing means, to interrupt the operation of said card feeding means after the last card of each group has passed the sensing means, summary card punching mechanism initiated by said group control mechanism after card feeding is interrupted, in combination with an offsetting device for operating on the cards to offset them to one side of their normal line of travel while maintaining the same plane of travel, cyclically operable means operable concurrently with said feeding means and means controlled thereby for ascertaining whether the card of a single card group has or the cards of a multiple card group have passed the sensing means prior to the operation of said group control mechanism, means controlled by said group control mechanism and said ascertaining means jointly upon passage of each multiple card group to cause operation of said punching mechanism, and upon passage of a single card group to prevent such operation and further means controlled by said ascertaining means and said group control mechanism upon passage of a single card group for rendering said offsetting device effective to offset the single card group.

2. In a machine controlled by record cards advanced therethrough in succession, wherein the record cards each contain classification designations and are arranged in groups according to said designations so that single card groups may be interspersed with multiple card groups, said machine having card feeding means for normally advancing the cards in a predetermined line of travel, means for sensing the classification designations on the cards, group control mechanism responsive to said sensing means, to interrupt the operation of said card feeding means after the last card of each group has passed the sensing means, an offsetting device for operating on the cards to offset them to one side of their normal line of travel while maintaining the same plane of travel, cyclically operable means operable concurrently with said feeding means and means controlled thereby for ascertaining whether the card of a single card group has or the cards of a multiple card group have passed the sensing means prior to the operation of said group control mechanism, cyclically operable mechanism rendered operative by said group control mechanism and means controlled by said ascertaining means and said last named cyclically operable mechanism jointly when a single card group has passed the sensing devices to effect an operation of said offsetting device to offset the single card group.

3. In a machine controlled by record cards advanced therethrough in succession, wherein the record cards each contain item and classification designations and are arranged in groups according to said classification designations so that single card groups may be interspersed with multiple card groups, said machine having card feeding means for normally advancing the cards in a predetermined line of travel, means for sensing the item designations on the cards, an accumulator controlled thereby, means for sensing the classification designations on the cards, group control mechanism responsive to said classification sensing means to interrupt the operation of said card feeding means after the last card of each group has passed the sensing means, means initiated by said group control mechanism for performing total printing operations under control of said accumulator after card feeding is interrupted, summary card punching mechanism controllable by said accumulator upon a group change, means operative upon completion of said total printing and punching operations for causing resumption of card feeding, cyclically operable means operable concurrently with the card feeding means and means controlled thereby for ascertaining whether the card of a single card group has or the cards of a multiple card group have passed the sensing means prior to the operation of said group control mechanism, in combination with means controlled by said ascertaining means and said group control mechanism for rendering said punching mechanism effective when the passage of a multiple card group is ascertained and ineffective when the passage of a single card group is ascertained, separating means for operating on the single card groups to separate them from the cards being fed, and further means controlled by said ascertaining means and said group control mechanism for rendering said separating means effective to operate on single card groups and ineffective to operate on the cards of a multiple card group.

4. In a machine controlled by record cards advanced therethrough in succession, wherein the record cards each contain item and classification designations and are arranged in groups according to said classification designations so that single card groups may be interspersed with multiple card groups, said machine having card feeding means for normally advancing the cards in a predetermined line of travel, means for sensing the item designations on the cards, an accumulator controlled thereby, means for sensing the classification designations on the cards, group control mechanism responsive to said classification sensing means to interrupt the operation of said card feeding means after the last card of each group has passed the sensing means, means initiated by said group control mechanism for performing total printing operations under control of said accumulator after card feeding is interrupted, summary card punching mechanism controllable by said accumulator upon a group change, means operative upon completion of said total printing and punching operations for causing resumption of card feeding, cyclically operable means operable concurrently with the card feeding means and means controlled thereby for ascertaining whether the card of a single card group has or the cards of a multiple card group have passed the sensing means prior to the operation of said group control mechanism, in combination with means controlled by said ascertaining means and said group control mechanism for rendering said punching mechanism effective when the passage of a multiple card group is ascertained and ineffective when the passage of a single card group is ascertained, an offsetting device for operating on the cards to offset them to one side of their normal line of travel, and further means controlled by said ascertaining means and said group control mechanism for rendering said offsetting device effective to offset single card groups and ineffective to offset the cards of a multiple card group.

GEORGE F. DALY.
GORDEN S. WELLS.